(12) United States Patent
White et al.

(10) Patent No.: US 10,844,185 B2
(45) Date of Patent: Nov. 24, 2020

(54) BRANCHED INTERCONNECTED MICROVASCULAR NETWORK IN POLYMERS AND COMPOSITES USING SACRIFICIAL POLYLACTIDE FILMS, SHEETS, AND PLATES

(71) Applicant: The Board of Trustees of the University of Illinois, Urbana, IL (US)

(72) Inventors: Scott R. White, Champaign, IL (US); Nancy R. Sottos, Champaign, IL (US); Piyush R. Thakre, Lake Jackson, TX (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 49 days.

(21) Appl. No.: 16/138,573

(22) Filed: Sep. 21, 2018

(65) Prior Publication Data

US 2019/0119459 A1  Apr. 25, 2019

Related U.S. Application Data

(62) Division of application No. 14/536,077, filed on Nov. 7, 2014, now Pat. No. 10,081,715.

(60) Provisional application No. 61/904,032, filed on Nov. 14, 2013.

(51) Int. Cl.
*C08J 5/18* (2006.01)
*B29L 22/00* (2006.01)
*B29C 43/00* (2006.01)

(52) U.S. Cl.
CPC .............. *C08J 5/18* (2013.01); *B29C 43/003* (2013.01); *B29L 2022/007* (2013.01); *C08J 2367/04* (2013.01); *Y10T 428/24744* (2015.01)

(58) Field of Classification Search
CPC ....... C08L 67/04; C08L 67/025; C08G 63/08; C08G 63/02; C08G 63/06; C08G 63/065; Y10T 428/24744; Y10T 428/25; Y10T 428/256; Y10T 428/257; Y10T 428/258; C08J 5/18
See application file for complete search history.

(56) References Cited

U.S. PATENT DOCUMENTS

| | | | |
|---|---|---|---|
| 7,569,625 B2 | 8/2009 | Keller et al. | |
| 2008/0003433 A1 | 1/2008 | Mikami | |
| 2008/0305343 A1 | 12/2008 | Toohey et al. | |
| 2009/0191402 A1 | 7/2009 | Beiermann et al. | |
| 2011/0040278 A1 | 2/2011 | Pedrozo | |
| 2011/0085949 A1 | 4/2011 | Roy et al. | |

(Continued)

FOREIGN PATENT DOCUMENTS

| | | |
|---|---|---|
| CA | 2838018 A1 | 12/2012 |
| WO | 2007005657 A3 | 11/2007 |

OTHER PUBLICATIONS

Fan et. al., "Thermal Degradation of Poly(L-lactide): Effect of Alkali Earth Metal Oxides for Selective L,L-lactide Formation," Polymer, 45(4):1197-1205, Feb. 2004.

(Continued)

*Primary Examiner* — Catherine A. Simone
(74) *Attorney, Agent, or Firm* — Haukaas Fortius PLLC; Michael H. Haukaas (57) ABSTRACT

A thermally degradable polymeric sheet, comprising: a poly(hydroxyalkanoate); and a metal selected from the group consisting of an alkali earth metal and a transition metal; where the volume fraction of the metal in the sheet is at least 0.1 vol %.

20 Claims, 9 Drawing Sheets

(56) References Cited

U.S. PATENT DOCUMENTS

2011/0155667 A1    6/2011    Charest et al.
2013/0065042 A1    3/2013    Esser-Kahn et al.

OTHER PUBLICATIONS

Toohey et. al., "Delivery of Two-Part Self-Healing Chemistry via Microvascular Networks," Adv. Funct. Mater., 19 (9):1399-1405, Mar. 2009.
Toohey et. al., "Self-healing Materials with Microvascular Networks," Nat. Mater., 6:581-585, Jun. 2007.
Fan et al., "Pyrolysis Kinetics of Poly(L-lactide) with Carboxyl and Calcium Salt End Structures," Polym Degrad Stabil., 79(3):547-562, Mar. 2003.
Fan et al., "Racemization on Thermal Degradation of Poly(L-lactide) with Calcium Salt End Structure," Polym Degrad Stabil., 80(3):503-511, Jun. 2003.

BRANCHED INTERCONNECTED MICROVASCULAR NETWORK IN POLYMERS AND COMPOSITES USING SACRIFICIAL POLYLACTIDE FILMS, SHEETS, AND PLATES

RELATED APPLICATIONS

This application is a Divisional application of U.S. patent application Ser. No. 14/536,077, filed Nov. 7, 2014, now issued as U.S. Pat. No. 10,081,715, which claims the benefit of U.S. Provisional Application No. 61/904,032, entitled "Branched interconnected microvascular network in polymers and composites using sacrificial polylactide films, sheets and plates" filed Nov. 14, 2013, which applications are incorporated herein by reference in their entirety.

FEDERALLY SPONSORED RESEARCH OR DEVELOPMENT

This invention was made with government support under contract number FA9550-09-1-0686, awarded by the Air Force Office of Scientific Research. The government has certain rights in the invention.

BACKGROUND

Synthetic composite materials possess desirably high strength-to-weight ratios; however, composites typically lack dynamic functionality that occurs in natural composite materials. Natural composite materials, for example, rely on pervasive vascular networks to enable a variety of biological functions, in both soft and hard tissue. Composite structures such as bone tissue or wood are lightweight and have high strength, yet contain extensive vasculature capable of transporting mass and energy.

An ongoing challenge in materials science is the development of microvascular networks in synthetic composites, where the composite materials may be formed using conventional composite manufacturing processes. Specialized fabrication methods such as laser-micromachining, soft lithography, templating with degradable sugar fibers, and incorporating hollow glass or polymeric fibers can produce some microvascular structures in composite materials. These specialized methods, however, are not currently suitable for rapid, large-scale production of fiber-reinforced composites with complex vasculatures.

In one approach to microfluidic composites, relatively short microfluidic channels are provided in a matrix in the form of hollow glass fibers (WO 2007/005657 to Dry). The glass fibers are present as repair conduits containing a fluid that can heal a crack in the composite matrix. A significant limitation of this approach is the brittle nature of the hollow glass fibers, which limits the shapes and lengths of microfluidic channels that can be present in the composite. In addition, the glass fibers cannot readily be used to form a microfluidic network.

In another approach to microfluidic composites, microfluidic channels are formed in a polymeric matrix by arranging hollow polymeric fibers and then forming the matrix around the hollow polymeric fibers (U.S. Publication No. 2008/0003433 to Mikami). Hollow polymeric fibers may offer a wider variety of microfluidic channel shapes than those available from hollow glass fibers. This approach, however, also has a number of limitations, including an inability to form a network from the individual hollow fibers, the relatively small number of materials available as hollow fibers, and the possibility of incompatibility between the hollow fiber and the matrix and/or between the hollow fiber and substances introduced into the channels.

Microfluidic networks can be formed in a polymeric matrix using a three-dimensional (3-D) direct-write assembly technique (U.S. Publication No. 2008/0305343 to Toohey et al.). While this fabrication method provides excellent spatial control, the resulting networks typically will not survive the mechanical and/or thermal stresses encountered in the conventional processes of forming reinforced composites.

Fabrication of microvascular composites using sacrificial fibers is described in U.S. Publication No. 2013/0065042 to Esser-Kahn et al., where the construction of microvascular networks within a fiber-reinforced composite by vaporization of sacrificial fibers is taught. The pre-processing of sacrificial fibers involves solvent assisted diffusion of catalyst particles into poly(lactic acid) fibers followed by solvent evaporation, or the wet spinning of mixtures of poly(lactic acid) and catalysts.

However, composites fabricated using this method have limitations in terms of flexibility to form interconnections in a repeatable and reliable manner as the interconnections using sacrificial fibers are mainly formed by creating physical contacts between fibers or solvent welding of fibers (see FIGS. 31A-E of U.S. Publ. No. 2013/0065042). As such, connecting microfluidic channels with in-plane interconnections to form complex in-plane architectures is not possible. As a result, the resulting microchannels lack spatial interconnectivity, thus limiting fluidic pathway redundancy.

Moreover, the solvent assisted diffusion of catalyst particles into poly(lactic acid) is time consuming, taking an average of fifty hours for infiltrating the catalyst into the poly(lactic acid). The evacuation of the products resulting from the vaporization of the sacrificial fibers can also be inconsistent and in some cases incomplete due to blockages from residual catalyst particle agglomerations within the micro-channels.

SUMMARY

In one aspect, there is provided a thermally degradable polymeric sheet, comprising: a poly(hydroxyalkanoate); and a metal selected from the group consisting of an alkali earth metal and a transition metal; where the volume fraction of the metal in the sheet is at least 0.1 vol %.

In a second aspect, there is provided a microvascular system, comprising: a polymeric matrix, and a planar structure comprising a plurality of microfluidic channels in the matrix, where at least a portion of the microfluidic channels are interconnected, and the interconnections between the interconnected channels are in-plane interconnections.

In a third aspect, there is provided a method of making a microvascular system, comprising: forming a composite comprising a polymeric matrix, and a sacrificial layer; heating the composite to a first temperature from 150 to 250° C.; maintaining the composite at a second temperature from 150 to 250° C. for a time sufficient to form degradants from the sacrificial layer, the degradants having a weight average molecular weight less than 500 Daltons; and removing the degradants from the composite to provide a plurality of microfluidic channels.

In a fourth aspect, there is provided a method of making a microvascular system, comprising: forming a composite, comprising: embedding a sacrificial layer between a first layer and a second layer, the first layer comprising a first polymeric matrix precursor, the second layer comprising a second polymeric matrix precursor, the sacrificial layer having a first side and a second side opposite the first side, the first side facing the first layer, the second side facing the second layer, curing the first polymeric matrix precursor and the second polymeric matrix precursor, to form a polymeric matrix; heating the composite to a temperature from 150 to 250° C.; maintaining the composite at a temperature from 150 to 250° C. for a time sufficient to form degradants from the sacrificial layer, the degradants having an average molecular weight less than 500 Daltons; and removing the degradants from the composite to provide a plurality of microfluidic channels.

In this fourth aspect, the forming the composite may comprise heating the first polymeric matrix precursor and the second polymeric matrix precursor to a temperature of at least 75° C. for a time sufficient to form the polymeric matrix. The first polymeric matrix precursor may be the same as the second polymeric matrix precursor. The first polymeric matrix precursor and the second polymeric matrix precursor may independently comprise a polymer selected from the group consisting of a polyamide, a polyester, a polycarbonate, a polyether, an epoxy polymer, an epoxy vinyl ester polymer, a polyimide, an amine-formaldehyde polymer, a polysulfone, a poly(acrylonitrile-butadiene-styrene), a polyurethane, a polyolefin, a polyacrylate, a poly(alkylacrylate), a polysilane, a polyphosphazene, and combinations thereof. At least one of the first layer and the second layer may be selected from the group consisting of a fiber reinforced prepreg and a fabric reinforced prepreg. At least one of the first layer and the second layer may be selected from the group consisting of a glass fiber prepreg and a carbon fiber prepreg. The sacrificial layer may comprise a poly(hydroxyalkanoate), and a metal selected from the group consisting of an alkali earth metal and a transition metal, where the mass fraction of the metal in the sacrificial layer is at least 0.1 percentage volume fraction. The sacrificial layer has an average thickness of 1 µm to 3000 µm. The method may further comprise cutting the sacrificial layer with a laser beam. The sacrificial layer may be compression molded. At least a portion of the microfluidic channels may be interconnected.

To provide a clear and more consistent understanding of the specification and claims of this application, the following definitions are provided.

The term 'polymeric' means a substance that includes a polymer.

The term 'polymer' means a substance containing more than 100 repeat units.

The term "polymer" includes soluble and/or fusible molecules having long chains of repeat units, and also includes insoluble and infusible networks. The term "prepolymer" means a substance containing less than 100 repeat units and that can undergo further reaction to form a polymer.

The term "matrix" means a continuous phase in a material.

The term "matrix precursor" means a composition that will form a polymer matrix when it is solidified. A matrix precursor may include a polymer precursor, such as a monomer and/or prepolymer, that can polymerize to form a solid polymer matrix. A matrix precursor may include a polymer that is dissolved or dispersed in a solvent, and that can form a solid polymer matrix when the solvent is removed. A matrix precursor may include a polymer at a temperature above its melt temperature, and that can form a solid polymer matrix when cooled to a temperature below its melt temperature.

The term "microfluidic channel" means a substantially tubular structure having a diameter less than 1,000 micrometers.

The term "microfluidic network" means a plurality of channels having a plurality of interconnections, where at least a portion the channels have a dimension less than 1,000 micrometers.

The term "fluid communication" means that two objects are in an orientation, and within a sufficient proximity to each other, such that fluid can flow from one object to the other. The term "fluid" means a substance in the liquid or gaseous state. In one example, if a microfluidic channel embedded in a matrix is in fluid communication with a surface of the matrix, then fluid can flow from the channel onto the surface.

BRIEF DESCRIPTION OF THE DRAWINGS

The invention can be better understood with reference to the following drawings and description. The components in the figures are not necessarily to scale and are not intended to accurately represent molecules or their interactions, emphasis instead being placed upon illustrating the principles of the invention. Moreover, in the figures, like referenced numerals designate corresponding parts throughout the different views.

DETAILED DESCRIPTION

The present application provides a novel method for manufacturing thermally degradable planar materials. Such planar materials may be films having a thickness of at least 1 µm and less than 500 µm, sheets having a thickness of at least 500 µm and less than 3000 µm, and plates having a thickness of at least 3000 µm and less than 10000 µm. In preferred embodiments, the planar materials have a thickness from 50 µm to 1000 µm. Such planar materials can be cut to form planar networks which in turn may be used to form microvascular systems featuring microfluidic channels interconnected by in-plane interconnections, to form previously unattainable complex in-plane architectures, for example in the context of composite materials.

It has now been discovered that poly(hydroxyalkanoate)s can be compression-molded to produce thermally degradable planar materials including a polymeric matrix and a catalyst in the matrix that lowers the degradation temperature of a thermally degradable poly(hydroxyalkanoate) matrix polymer to within an appropriate temperature window, so that the planar material degrades at temperatures above those typically used for forming composite materials, but below the typical degradation temperatures of composite materials. The desirable mechanical properties of the planar materials do not degrade at temperatures below the degradation temperature, and the materials can be used successfully as sacrificial layers in the production of microvascular systems. The sacrificial planar materials preferably feature a matrix including a poly(hydroxy-alkanoate), and a metal selected from the group consisting of an alkali earth metal and a transition metal, in the matrix, where the concentration of the metal in the planar material is at least 0.1 volume fraction (vol %).

A poly(hydroxyalkanoate) is an aliphatic polyester having the general structure:

where n is an integer of at least 10, x is an integer from 0 to 4, and $R^1$-$R^4$ independently are —H or an alkyl group. Examples of poly(hydroxyalkanoate)s include poly(3-hydroxybutyrate) (P3HB), poly(4-hydroxybutyrate) (P4HB), poly(3-hydroxyvalerate) (PHV), polycaprolactone, poly (lactic acid) (PLA), poly(glycolic acid) (PGA), and copolymers of the monomeric units of these polymers.

Example metals include alkaline earth metals or a transition metals dispersed in a poly(hydroxyalkanoate) matrix. In representative embodiments, the metal is preferably present in the planar material as a metal oxide, such as MgO, CaO, BaO, or SrO. The metal may also be present as a metal triflate, such as scandium triflate (Sc(OTf)$_3$). More preferably, the metal is present as an organic metal salt, such as a metal oxalate, metal acetate, or metal octoate. Particularly preferred are metal oxalates, such as tin(II)oxalate (SnOx).

Preferably the volume fraction of the metal in the planar material is at least 0.2 vol %, at least 0.5 vol %, at least 1 vol %, at least 2 vol %, at least 2.5 vol %, at least 3 vol %, at least 5 vol %, at least 7 vol %, or at least 10 vol %. In representative embodiments, the volume fraction of the metal in the planar material may be from 0.1 to 10 vol %, from 0.2 to 7 vol %, from 0.5 to 5 vol %, or from 1 to 3 vol %.

Poly(lactic acid) (PLA) is a thermoplastic poly(hydroxyalkanoate) that degrades by depolymerizing at temperatures above 280° C., forming lactide as a gaseous degradant. Existing epoxy processing protocols, however, can require milder processing conditions, to prevent damage to the epoxy matrix. Although it had been reported that the depolymerization temperature of PLA films could be reduced by blending PLA with calcium oxide or tin reagents (Y. Fan, H. Nishida, T. Mori, Y. Shirai, T. Endo, Polymer, 2004, Vol. 45, page 1997), it was not known whether a catalyst incorporated into planar materials of PLA could provide a material that would survive required polymer-processing conditions but still depolymerize within an appropriate temperature range, without degrading the desirable mechanical properties of the planar materials below the degradation temperature $T_a$.

When incorporated into a composite, a PLA planar material including an alkali earth metal or a transition metal, where the concentration of the metal in the planar material matrix is at least 0.1 vol %, may be removed by heating-induced degradation preferably at 150° C. to 250° C. More preferably, the material degrades at 165° C. to 235° C. Particularly preferred are materials degrading at 180° C. to 220° C., such as PLA planar materials including SnOx. This narrow temperature window is above those of typical fiber-reinforced composite (FRC) processing conditions, but below typical polymer matrix decomposition temperatures, which usually fall in the range of about 200° C. to 240° C. for epoxy matrices.

The heating and removal may occur over the course of several minutes to several hours. Preferably, the heating and removal are completed in at most 24 hours, at most 5 hours, at most 3 hours, or at most 2 hours. The clearing of lactide from the channels formed by degradation of PLA layers including an alkali earth metal or a transition metal typically results in a very low number of obstructions. Hidden defects in the channels may be present, and may be caused by complex channel geometries. Defects may be detected by calculating a theoretical value for pressure drop according to the Hagen-Pouiselle relation and comparing the prediction with a measured pressure head for the channels. A negligible difference from between these values indicates geometric uniformity and substantially complete channel clearing.

An example method of making a thermally degradable planar material features forming a mixture including melted PLA and a metal selected from the group consisting of an alkali earth metal and a transition metal, followed by compression molding of the mixture into a planar material of desired thickness. By including optimal amounts of metal, the PLA and metal mixture may be heated to a temperature in a range between the melting temperature of the mixture and the PLA degradation temperature, and then cast into the planar material.

In one representative example, PtA pellets may be melted and mixed with tin(II) oxalate powder, for example in a twin screw extruder, to obtain a mixture containing a 1% to 10% volume fraction of metal that may be subjected to compression molding to form a planar material. As compared to traditional methods, such as solvent assisted catalyst diffusion, the processing time for making the sacrificial material suitable for "Vaporization of Sacrificial Components" (VaSC) is reduced from about fifty hours to one hour. As shown in the examples below, example metal-containing planar materials converted to gas at a lower temperature and in less time than did pure PLA planar materials, as measured by isothermal gravimetric analysis (iTGA), indicating a lower depolymerization onset temperature. The thermally degradable planar material may be cut into intricate shapes, such as a planar interconnected network. At present, laser beams are believed to provide the fastest and most accurate way to cut the planar material into intricate shapes. Alternatively, an interconnected network or other desired patterns may be obtained by casting the mixture into a casting mold of such network.

In another aspect, there is provided a microvascular system including a polymeric matrix and a planar structure including a plurality of microfluidic channels structure in the matrix. At least a portion of the microfluidic channels are interconnected, and the interconnections between the interconnected microfluidic channels are "in-plane", that is, are located in a plane defined by a longitudinal section of the planar structure. Such microfluidic channels may form interconnected networks of desired geometries and the ability to create multiple levels of controlled branching.

Such networks can provide uniform distributions of fluid throughout a material, which may be useful in applications such as active cooling and heating, self-healing, regeneration, and antennas. The networks can also be filled with a conductive material, to form electric or electronic circuits. Other applications include the forming of porous, weight-saving composite materials and lighter packaging materials. In accordance with another aspect of the present invention a microvascular system may be formed from composites containing sacrificial layers. The sacrificial layers may be used to form biomimetic material systems in a reliable manner, and may be used to model, reproduce and/or extend transport functions performed by microvascular systems in nature. Composite materials containing both sacrificial layers in solid polymeric matrices can be used to provide reinforced microvascular composites, such as those described above.

Figure 1:
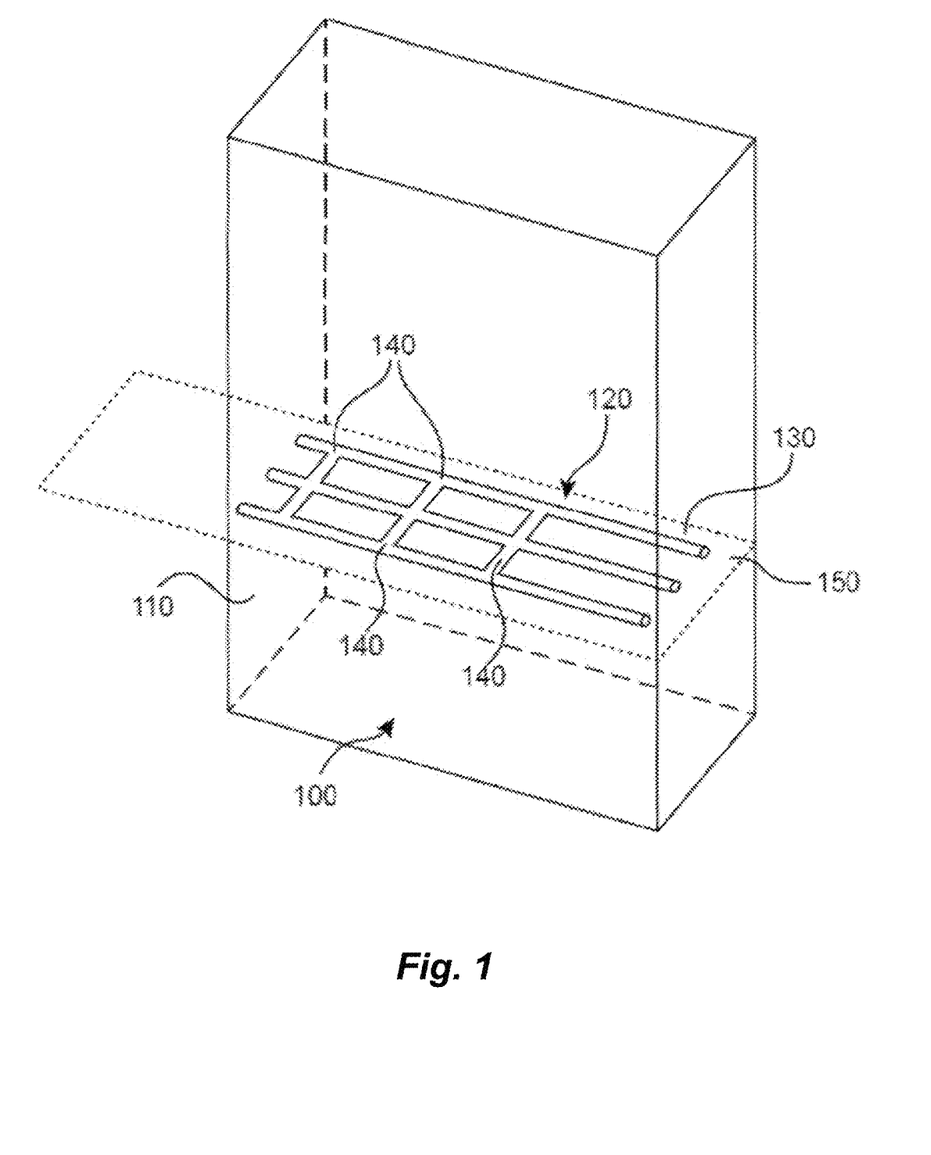
FIG. 1 depicts a schematic representation of a microvascular system.

FIG. 1 depicts a schematic representation of a microvascular system 100, which includes a polymeric matrix 110 and a planar structure 120 in the matrix. The planar structure 120 includes a plurality of microfluidic channels 130. Preferably at least a portion of the microfluidic channels 130 are interconnected, and the interconnections 140 between the interconnected channels are in-plane interconnections with regard to plane 150.

The polymer matrix 110 may include a polyamide such as nylon; a polyester such as poly(ethylene terephthalate) and polycaprolactone; a polycarbonate; a polyether; an epoxy polymer; an epoxy vinyl ester polymer; a polyimide such as polypyromellitimide (for example KAPTAN); a phenol-formaldehyde polymer such as BAKELITE; an amine-formaldehyde polymer such as a melamine polymer; a polysulfone; a poly(acrylonitrile-butadiene-styrene) (ABS); a polyurethane; a polyolefin such as polyethylene, polystyrene, polyacrylonitrile, a polyvinyl, polyvinyl chloride and poly(DCPD); a polyacrylate such as poly(ethyl acrylate); a poly(alkylacrylate) such as poly(methyl methacrylate); a polysilane such as poly(carborane-silane); and a polyphosphazene.

The polymer matrix 110 may include an elastomer, such as an elastomeric polymer, an elastomeric copolymer, an elastomeric block copolymer, and an elastomeric polymer blend. Examples of elastomer polymers include polyolefins, polysiloxanes such as poly(dimethylsiloxane) (PDMS), polychloroprene, and polysulfides; examples of copolymer elastomers may include polyolefin copolymers and fluorocarbon elastomers; examples of block copolymer elastomers may include acrylonitrile block copolymers, polystyrene block copolymers, polyolefin block copolymers, polyester block copolymers, polyamide block copolymers, and polyurethane block copolymers; and examples of polymer blend elastomers include mixtures of an elastomer with another polymer. Composite materials that include an elastomer as the polymer matrix are disclosed, for example, in U.S. Pat. No. 7,569,625 to Keller et al, and in U.S. Application Publication 2009/0191402 to Beiermann et al, which are incorporated by reference. The polymer matrix 110 may include a mixture of these polymers, including copolymers that include repeating units of two or more of these polymers, and/or including blends of two or more of these polymers.

The polymer matrix 110 may include other ingredients in addition to the polymeric material. For example, the matrix may contain one or more particulate fillers, stabilizers, antioxidants, flame retardants, plasticizers, colorants and dyes, fragrances, or adhesion promoters. An adhesion promoter is a substance that increases the adhesion between two substances, such as the adhesion between two polymers. One type of adhesion promoter that may be present includes substances that promote adhesion between the solid polymer matrix 110 and the planar structure 120. The planar structure 120 includes a plurality of microfluidic channels 140. The microfluidic channels 140 may include channels characterized by a thickness of 1 to 3,000 µm. The average thickness of the channels preferably is from 1 to 1,250 µm, more preferably is from 10 to 500 µm, and more preferably is from 50 to 250 µm. The microfluidic channels 140 preferably have a length of at least 1 centimeter.

Preferably at least a portion of the microfluidic channels 140 have a plurality of interconnections 150. Interconnections are present wherever a first portion of a channel contacts a second portion of the channel, or wherever a first channel contacts a second channel. In this manner, interconnections connect the channels at a plurality of locations, thus establishing fluid communication between the channels. Microfluidic channels 140 that are interconnected thus form a microfluidic network. More preferably, the interconnections between the interconnected channels are in-plane interconnections, that is, located in a plane 160 defined by a longitudinal section of the planar structure.

A fluid in the microfluidic channels 140 can flow through a channel and into another channel by way of an interconnection between the channels. If the polymeric matrix includes an inlet port, a fluid delivered through the inlet port can flow through the interconnected microfluidic channels within the polymeric matrix. If the interconnected microfluidic channels form a network, the introduced fluid may at least partially fill the network.

At least a portion of the microfluidic channels 140 can be independent, existing in the matrix 110 without any interconnect with another channel. In one example, all of the microfluidic channels 140 in a microvascular system 100 are independent, and the system does not include a microfluidic network. In this example, any fluid in an individual microfluidic channel 140 is not in fluid communication with a fluid in another microfluidic channel.

The microfluidic channels 140 may include a fluid, such as a gas or a liquid, or they may include a vacuum. The microvascular system 100 may be referred to as an "apomatrix" when the microfluidic channels 140 include a fluid. Without fluid, or with air, microvascular system 100 may be referred to as a "holomatrix".

The microfluidic channels 140 in the polymeric matrix 110 can affect the structural properties of the matrix, and the type and magnitude of the resulting structural property changes may depend on the properties of the channels and their configuration in the matrix. For example, it may be desirable for the microfluidic channels 140 to have a minimum channel spacing and a maximum channel diameter, which may help to minimize any decrease in the strength of the matrix.

Figure 2:
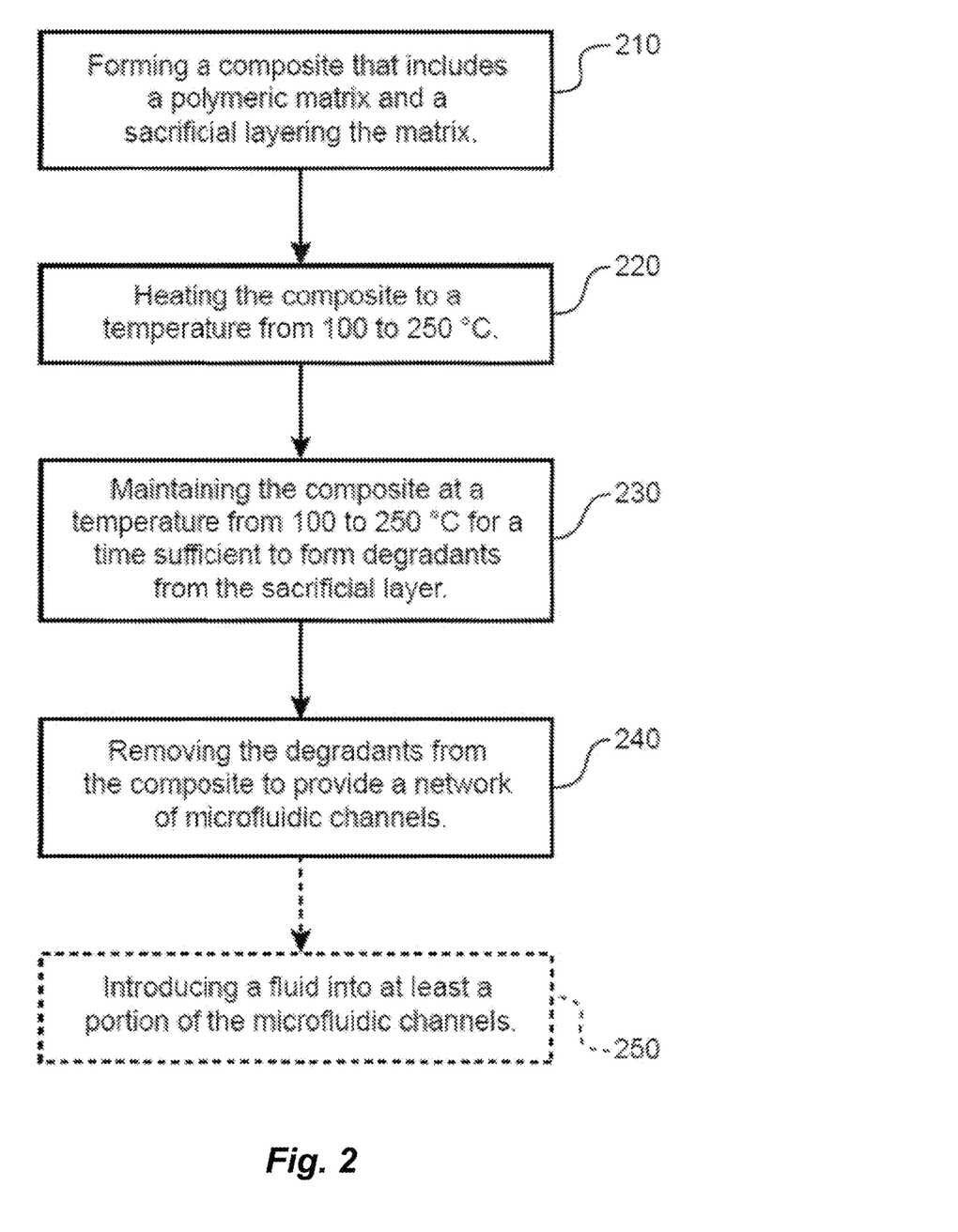
FIG. 2 depicts a method of making a microvascular system.

FIG. 2 illustrates a schematic representation of an example of a method of making a microvascular system. Method 200 includes forming 210 a composite that includes a polymeric matrix and a sacrificial layer in the matrix, heating 220 the composite to a temperature from 100 to 250° C., maintaining 230 the composite at a temperature from 100 to 250° C. for a time sufficient to form degradants from the sacrificial layer, and removing 240 the degradants from the composite to provide microfluidic channels. Method 200 optionally further includes introducing 250 a fluid into at least a portion of the microfluidic channels. Also optionally included is cutting the sacrificial layer, preferably with a laser beam.

Forming 210 a composite that includes a polymeric matrix and a sacrificial layer in the matrix may include combining a matrix precursor with the layer, and then solidifying the matrix precursor to form a polymer matrix. The method may further include forming and cutting the sacrificial layer, and/or forming the matrix precursor.

The matrix precursor may be any substance that can form a polymer matrix when solidified. The matrix precursor may be substantially homogeneous, or it may include other substances, such as fillers and/or viscosity modifiers. For example, a matrix precursor may include particles that can change the viscosity of the precursor and/or can change the properties of the polymeric matrix formed from the precursor. Examples of particles that may be present in the matrix precursor include plastic particles and non-plastic particles, such as ceramics, glasses, semiconductors, and metals.

In one example, the matrix precursor includes a monomer and/or prepolymer that can polymerize to form a polymer. At least a portion of the sacrificial layer may be contacted with the monomer or prepolymer and optionally other ingredients. The matrix precursor may then be solidified by polymerizing the monomer and/or prepolymer of the matrix precursor to form the polymer matrix.

Examples of monomers and/or prepolymers that can polymerize to form a polymer matrix include cyclic olefins; unsaturated monomers such as acrylates, alkylacrylates (including methacrylates and ethacrylates), styrenes, isoprene and butadiene; lactones (such as caprolactone); lactams; epoxy-functionalized monomers, prepolymers or polymers; functionalized siloxanes; and two-part precursors for polymers such as polyethers, polyesters, polycarbonates, polyanhydrides, polyamides, formaldehyde polymers (including phenol-formaldehyde, urea-formaldehyde and melamine-formaldehyde), and polyurethanes. Polymerization of a matrix precursor may include crosslinking of monomers and/or prepolymers to form an insoluble polymer network. Crosslinking may be performed by a variety of methods, including the addition of chemical curing agents, exposure to light or other forms of radiation, or heating. If a chemical curing agent is used, it may be added to the matrix precursor before or after it is combined with the sacrificial layer.

In another example, the matrix precursor includes a polymer in a matrix solvent. The polymer may be dissolved or dispersed in the matrix solvent to form the matrix precursor, and the sacrificial layers and optionally other ingredients then immersed into the matrix precursor. The matrix precursor may be solidified by removing at least a portion of the matrix solvent from the composition to form a solid polymer matrix.

In another example, the matrix precursor includes a polymer that is at a temperature above its melting temperature. The polymer may be melted to form the matrix precursor, optionally with other ingredients, and then applied to at least a portion of the sacrificial layer. The matrix precursor may be solidified by cooling the composition to a temperature below the melt temperature of the polymer to form the solid polymer matrix.

Forming 210 preferably includes contacting the sacrificial layer with a matrix precursor at a temperature of at least 75° C. In one example, forming 210 includes contacting at least a portion the sacrificial layer with a matrix precursor that includes a monomer and/or prepolymer, and heating the matrix precursor and sacrificial layer to a temperature of at least 75° C., for a time sufficient to polymerize the monomer and/or prepolymer. In another example, forming 210 includes contacting the sacrificial layer with a matrix precursor that includes a polymer that is at a temperature above its melting temperature, where the melting temperature is less than 75° C.

Heating 220 the composite to a temperature of from 100 to 250° C. and maintaining 230 the composite at a temperature of from 100° C. to 250° C. for a time sufficient to form degradants from the sacrificial layer may include, for example, placing the composite in an oven. The degradants preferably have an average molecular weight less than 500 Daltons, and preferably are in a gas phase.

Removing 240 the degradants from the composite may include contacting at least a portion of a surface of the composite with a vacuum source. Removing 240 the degradants from the composite may include contacting at least a portion of a surface of the composite with a pressurized fluid, such as a gas. Use of a pressurized fluid or a vacuum may facilitate removal of gaseous degradants. The composite may be maintained at a temperature of from 100° C. to 250° C. during the removal, or the temperature of the composite may be raised or lowered prior to or during the removal. Removing 240 the degradants from the composite may occur simultaneously with the heating 220 and/or maintaining 230 of the composite, or the removing may occur after the maintaining 230 of the composite.

Optionally introducing 250 a fluid into at least a portion of the microfluidic channels may include any of a variety of methods for introducing a fluid into a microfluidic channel. In one example, the fluid may be injected into one or more channels. In another example, one or more channel openings may be placed in contact with a reservoir of the fluid. The fluid may then flow through the channels through capillary action.

The sacrificial layer should remain solid during solidification of the matrix precursor into a polymeric matrix. For solidification by polymerization and/or curing, the sacrificial layer preferably should remain solid at temperatures up to 180° C. The sacrificial layer also should be easily removed from a polymeric matrix by degradation to volatile degradants at higher temperatures. The sacrificial layer also should have degradation and volatilization temperatures within a narrow range between the highest matrix solidification temperatures and the lowest thermal degradation temperatures of the polymeric matrix. Preferably, the degradation temperature ($T_d$) of the sacrificial layer is at most 250° C. Most preferably, the $T_d$ of the sacrificial layer is at least 180° C. and at most 220° C.

Figure 3:
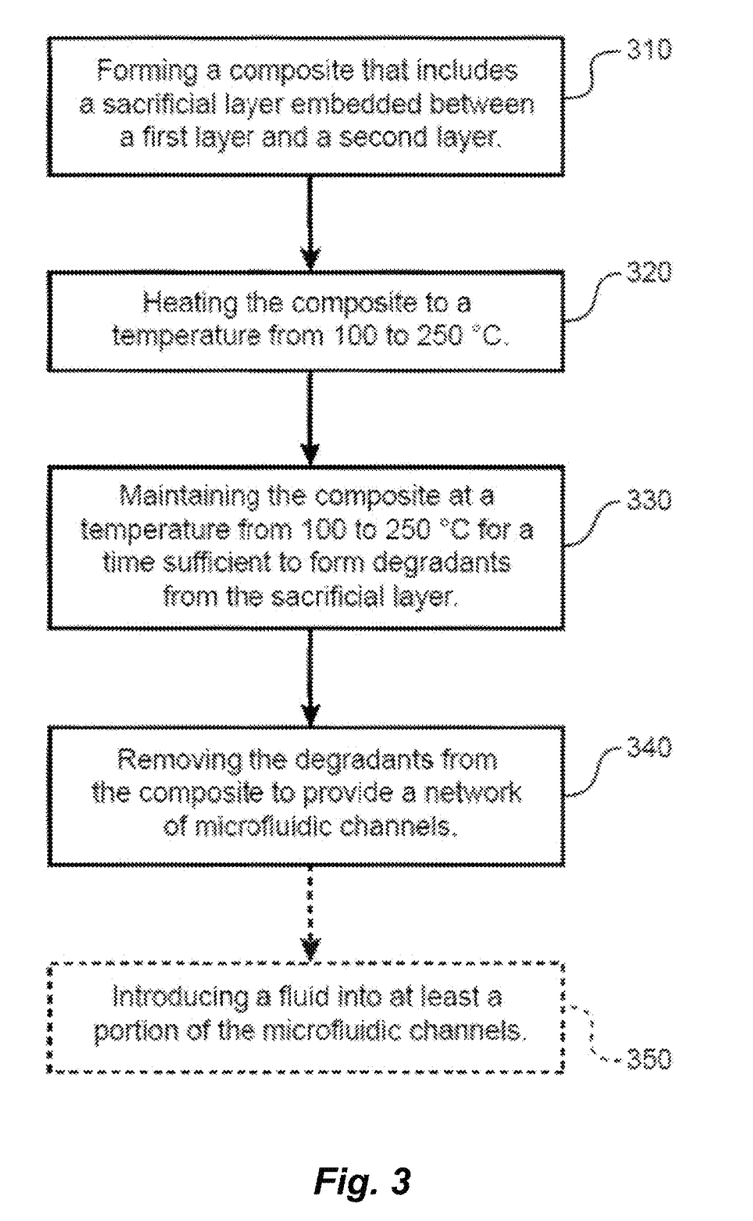
FIG. 3 depicts a method of making a microvascular system.

FIG. 3 illustrates a schematic representation of an example of a method of making a microvascular system, such as microvascular system 100 of FIG. 1. Method 300 includes forming 310 a composite that includes a sacrificial layer embedded between a first layer and a second layer. The first layer includes a first polymeric matrix precursor, the second layer includes a second polymeric matrix precursor. A first side of the sacrificial layer faces the first layer, and a second side of the sacrificial layer faces the second layer. The first polymeric matrix precursor and the second polymeric precursor are then cured, to form a polymeric matrix. Preferably, the first polymeric matrix precursor is the same as the second polymeric matrix precursor. Method 300 further includes heating 320 the composite to a temperature from 100° C. to 250° C., maintaining 330 the composite at a temperature from 100° C. to 250° C. for a time sufficient to form degradants from the sacrificial layer, and removing 340 the degradants from the composite to provide microfluidic channels. The degradants preferably have an average molecular weight less than 500 Daltons. Method 300 optionally further includes introducing 350 a fluid into at least a portion of the microfluidic channels.

In a representative set of embodiments, forming 310 a composite that includes a sacrificial layer embedded between a first layer and a second layer is achieved by a layer-by-layer cast molding method. The layer-by-layer cast molding method may include pouring a first layer precursor composition featuring a first polymeric matrix precursor in a mold, followed by partial curing of the first polymeric matrix precursor to achieve a partially-cured first polymeric layer. The sacrificial layer, for example a branched network formed by laser cutting of a thermally degradable PLA layer, is placed on the partially cured first polymeric layer. A second layer precursor composition comprising a second polymeric matrix precursor is then poured in the mold, to obtain a specimen which is subjected to complete curing of the first polymeric matrix precursor and second polymeric matrix precursor.

In instances where the polymeric matrix precursors are heat-curable, this may be achieved by heating to a temperature of, for instance, 75° C. or higher. One or both of the first layer precursor compositions may be a "prepreg", that is, pre-impregnated composite fibers. In prepregs, a fabric, or fibers of a material such as glass or carbon are impregnated in a partially cured matrix precursor, for instance an epoxy prepolymer. This configuration is especially useful for vacuum bagging-based processes to make layered composites with more than one microvascular networks. After curing, the composite may be trimmed to expose the ends of the sacrificial layer.

Heating 320 the composite to a temperature of from 100° C. to 250° C. and maintaining 330 the composite at a temperature of from 100° C. to 250° C. for a time sufficient to form degradants from the sacrificial layer may include, for example, placing the composite in an oven. The degradants preferably have an average molecular weight less than 500 Daltons, and preferably are in a gas phase. Removing 340 the degradants from the composite may include contacting at least a portion of a surface of the composite with a vacuum source or with a pressurized fluid. The heating 320, maintaining 330 and removing 340 may be as described above for heating 220, maintaining 230 and removing 240 of FIG. 2.

In one example, the heating 320 may be performed above 200° C., and the maintaining 330 and subsequent removing 340 may provide empty channels and a vascular network throughout the composite. Optionally introducing 350 a fluid into at least a portion of the microfluidic channels may include any of a variety of methods for introducing a fluid into a microfluidic channel, as described above for introducing 350 of FIG. 2. In one example, a microvascular composite is filled with a fluid having the desired physical properties to create a multifunctional material. The fluid may be chosen from a variety of liquids including aqueous solutions, organic solvents, and liquid metals. By circulating fluids with unique physical properties, a new generation of biphasic composite materials is enabled, in which the solid phase provides strength and form while the liquid phase provides interchangeable functionality.

Methods 200 and 300 are examples of a method referred to as Vaporization of Sacrificial Components (VaSC). The VaSC methods can provide composite materials that include microfluidic channels having a range of channel curvatures and diameters, allowing the construction of a wide variety of network architectures. The methods also can provide composite materials that include microfluidic channels that are interconnected and/or branched. Microchannels ranging in size from 20 to 500 micrometers have been created in epoxy matrices using VaSC methods.

Sacrificial layers for use in VaSC methods preferably have a combination of properties, including sufficient strength for combining with a matrix precursor using standard composite formation methods, mechanical integrity at temperatures typically used to form composites, and a degradation and volatilization temperature within a narrow range between the highest matrix solidification temperatures and the lowest thermal degradation temperatures of the polymeric matrix.

A variety of properties may be obtained with a single microvascular system by selection of one or more fluids for introduction to the microchannels. The variation in properties can be obtained without varying the composite's form factor. Examples of materials properties that may be affected by the fluid in the microchannels of the composites include thermal management, electro-magnetic signature, electrical conductivity tuning, and chemical reactivity. Solid materials, such as glass, polymer, or metal microbeads, may also be introduced in the microchannels.

The following examples are provided to illustrate one or more preferred embodiments of aspects the invention. Numerous variations can be made to the following examples that lie within the scope of the invention.

EXAMPLES

General Materials & Procedures

PLA pellets (P1566, Mw-63 kDa-150 kDa) were used as received from Sigma-Aldrich. PLA pellets (Mw-320 kDa) for forming fibers by solution spinning were used as received from Purac Biomaterials. Tin(II) oxalate (SnOx) catalyst powder was obtained from Sigma-Aldrich.

Diglycidyl ether of bisphenol F resin (DGEBPF or EPON 862) was used as received from Miller-Stephenson, and the curing agent EPIKURE 3300 was used as received from Hexion. Epoxy samples were prepared using a mass ratio of 24.8:100 parts per hundred (pph) EPIKURE 3300 to EPON 862.

Thermogravimetric analysis (TGA) was performed on a Mettler-Toledo TGA851e, calibrated with indium, aluminum, and zinc standards. For each experiment, the sample (approximately 10 mg) was weighed (±0.02 mg) in an alumina crucible. For dynamic measurements, the mass loss was recorded during a heating cycle over the temperature range of 25 to 650° C. at a heating rate of 10° C./min.

Differential scanning calorimetry (DSC) was performed on a Mettler-Toledo DSC 821e using a nitrogen atmosphere to measure heat flow (positive exothermal) from 25 to 600° C. at a heating rate of 10° C./min. For isothermal DSC experiments, the temperature was ramped from 25 to 200° C. at a rate of 50° C./min and subsequently held at 200° C. for 16 h.

An Xradia BioCT (MicroXCT-400) was used to image the SnOx catalyst particles in PLA matrix at 40 keV (8 W power and 200 μA current) at a 4× objective for 5 s exposure times. Rotation intervals were 0.25° for a complete 360° scan. Images were visualized in 3D with XM3Dviewer and reconstructed in 3D using XMReconstructor. Reconstructed images were reproduced in Amira to enhance the color and contrast.

Example 1: Development of Sheet Fabrication Method

PLA pellets were melted and mixed with tin(II) oxalate with a twin screw extruder. Successful sacrificial sheet fabrication was found to depend on the molecular weight of the PLA in the pellets and the weight fraction of the tin(II) oxalate. Melting temperatures and degradation temperatures were recorded using differential scanning calorimetry (DSC) for different combinations of PLA molecular weights and tin(II) oxalate volume fractions, as shown in FIG. 4.

Figure 4A:
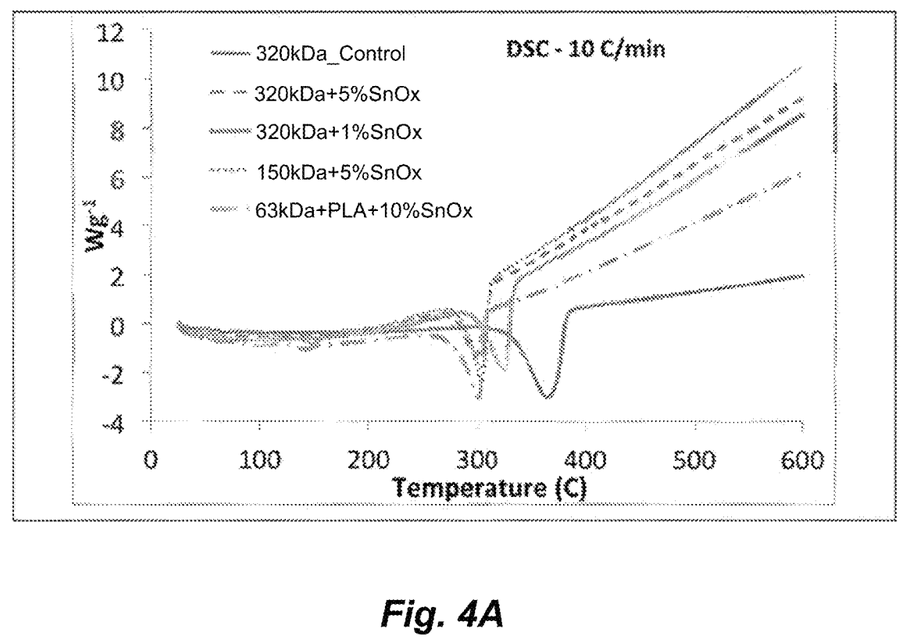
FIG. 4A represents melting temperature ranges for PLA polymers of differing Mw (mass average molar mass) and volume fractions of tin(II) oxalate powder.

FIG. 4(A) represents DSC curves showing melting temperature ranges for compression molded sheets fabricated with PLA having various molecular weight (63 kDa, 150 kDa, or 320 kDa), and different volume fractions of tin(II) oxalate. Such curves are based on data gathered from several attempts to produce sacrificial films and sheets of consistent thickness, and identify temperature ranges falling between the glass transition temperature ($T_g$) and the degradation temperature ($T_d$) of PLA and tin(II) oxalate mixtures. At temperatures within such ranges, the mixtures may be compression molded into sheets and films. Preferable tin(II) oxalate concentration ranges were found on the basis of the isothermal DSC graphs of FIG. 4(B), which show expedited degradation for compression molded PLA sheets with different concentrations of tin(II) oxalate.

Figure 4B:
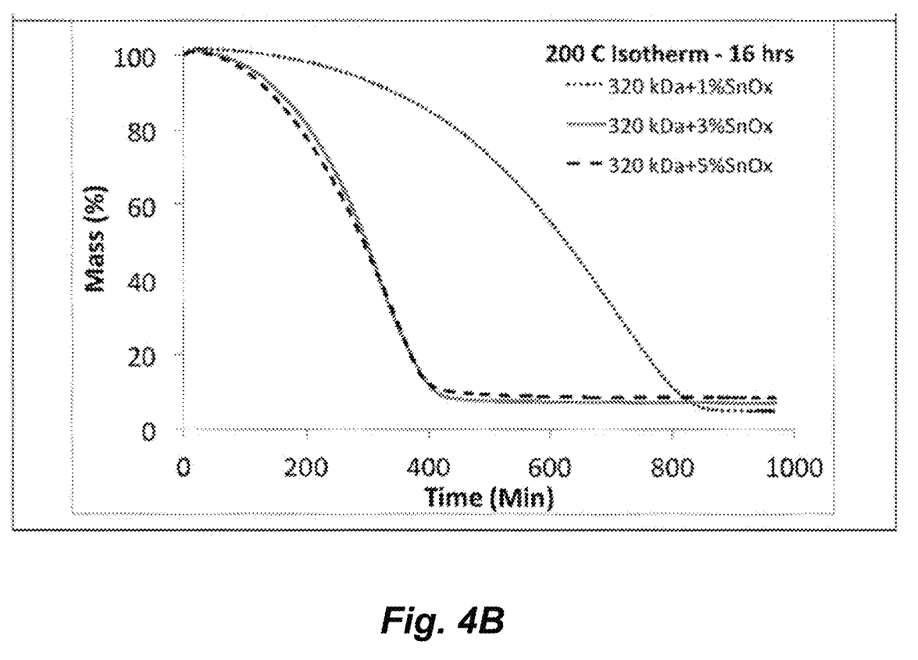
FIG. 4B represents isothermal DSC curves showing expedited degradation as a function of varying volume fractions of tin(II) oxalate.
Figure 5:
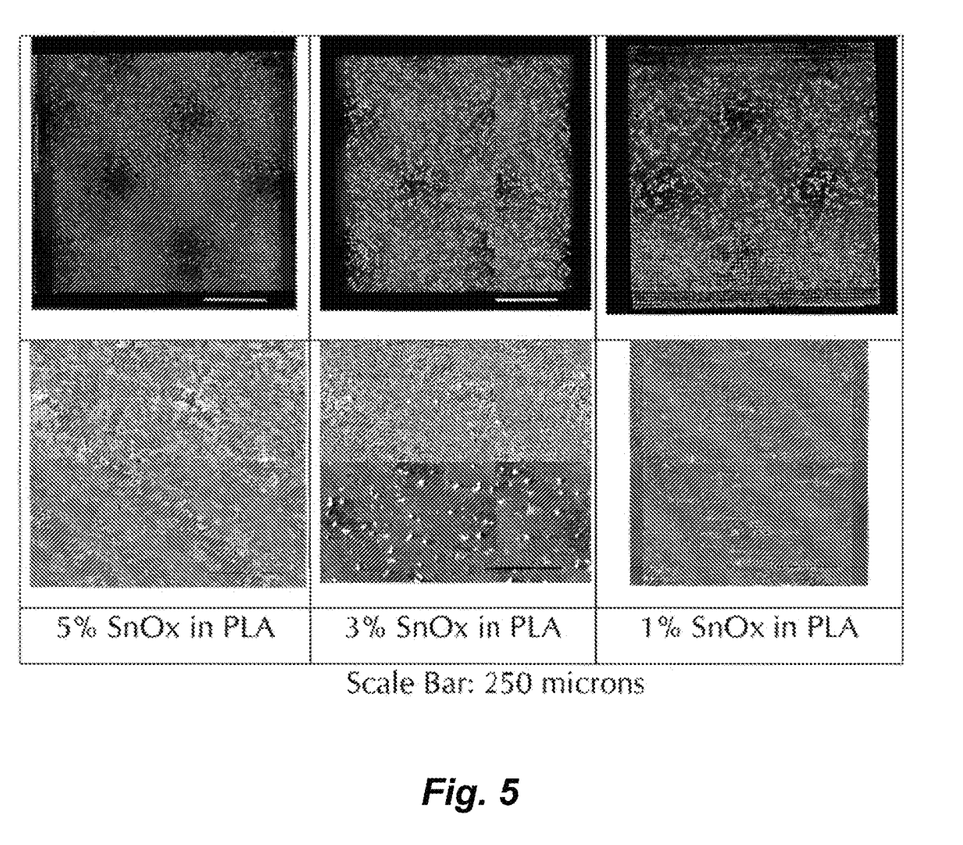
FIG. 5 depicts microCT images showing the dispersion of different volume fractions of tin (11) oxalate particles in a PLA matrix.

The findings illustrated in FIG. 4(B) helped in identifying the minimum amount of tin(II) oxalate required to efficiently degrade PLA within the least amount of time. In particular, it was found that the compression molding of PLA sacrificial films and sheets can be accomplished in about one hour, leading to significant time savings over the fifty hours taken by solvent assisted diffusion of catalyst into PLA. Homogeneous distribution of tin(II) oxalate was verified with microCT, as illustrated in FIG. 5.

Example 2: Development of Cutting Methods for Sacrificial Sheets

Figure 6A:
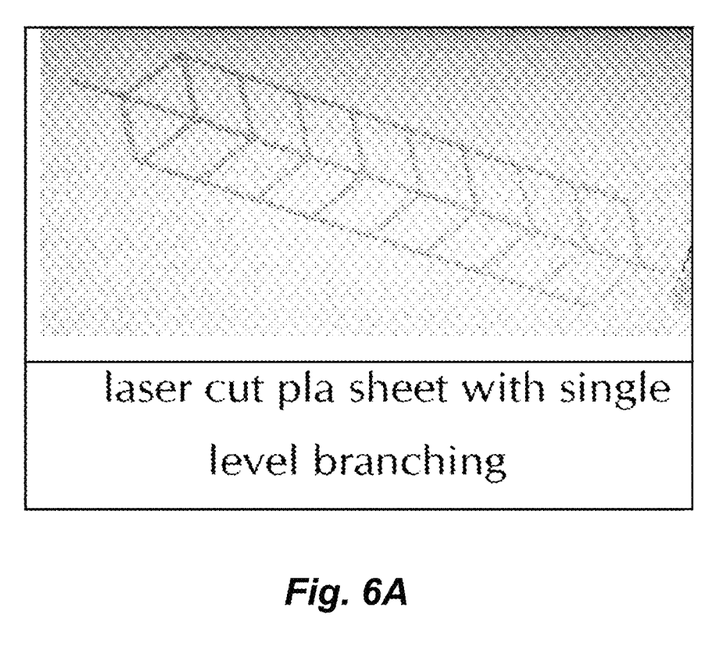
FIG. 6A depicts a laser cut PLA sheet with single level branching.
Figure 6B:
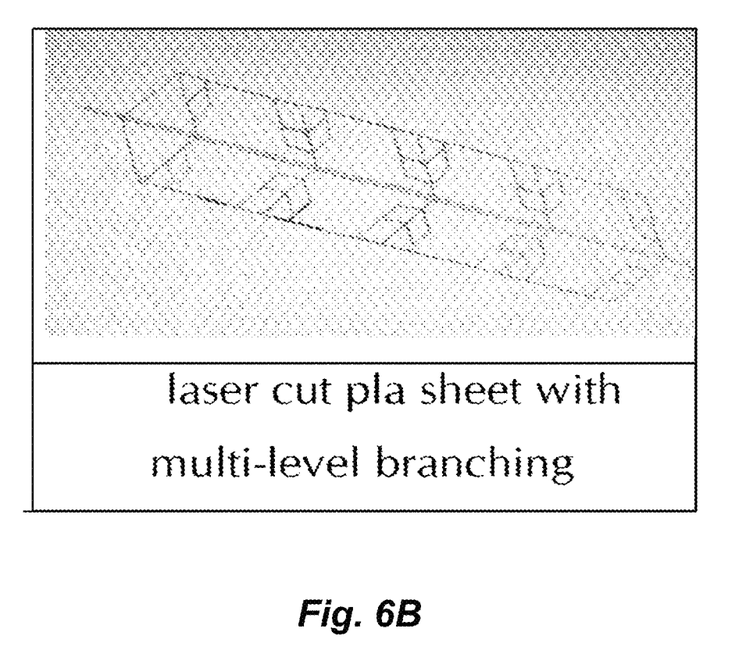
FIG. 6B depicts a laser cut PLA sheet with multiple levels of branching.
Figure 7A:
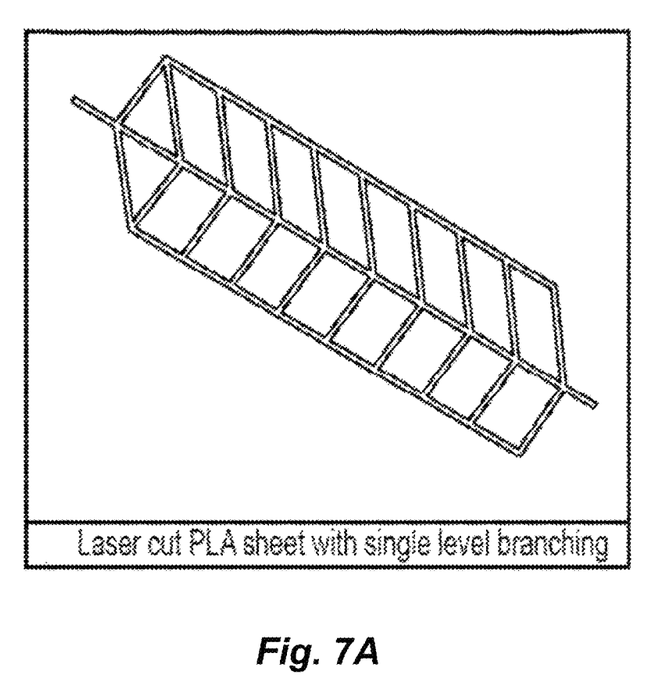
FIG. 7A is a pictorial representation of the laser cut PLA sheet of FIG. 6A.
Figure 7B:
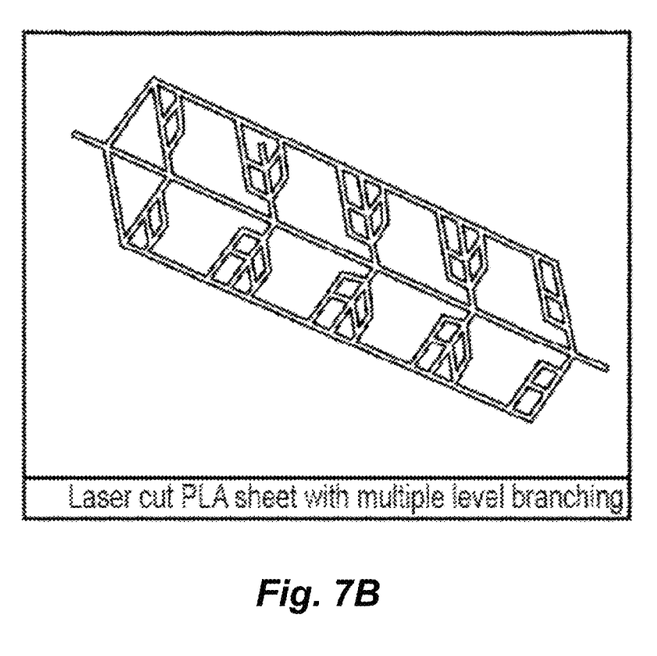
FIG. 7B is a pictorial representation of the laser cut PLA sheet of FIG. 6B.

Several cutting methods were tested on the compression molded sheets of Example 1, and laser cutting was found to be the fastest and cleanest methods for cutting planar PLA sheets into intricate shapes. Several speed and power settings on a $CO_2$ laser were tested in order to find the best settings for the thickness of PLA films, sheets, and plates. FIG. 6 depicts successful examples of single level and multi-level branched PLA sheets as well as multi-scale branching. In both instances, the interconnections between sections of the sheet are "in-plane", that is, are located in a plane resting along a longitudinal section of the sheet.

Example 3: Development of Prototypes

A layer-by-layer cast molding method was developed for the purpose of embedding a patterned sacrificial sheet in an EPON 862: EPIKURE 3300 epoxy matrix. An epoxy precursor mixture of EPON 862 and EPIKURE 3300 (100:24.8 (pbw) was poured into a room temperature vulcanization (RTV) silicon mold, to form a first epoxy layer filling half of the mold thickness. This first epoxy layer was partially cured at 82° C. for 90 minutes. A branched network cut from a PLA sheet was placed on the first epoxy layer, and a second layer of the epoxy precursor mixture was poured to completely fill the RTV mold. The resulting specimen was cured at 50° C., below the glass transition temperature ($T_g$) of PLA in order to maintain the structural integrity of the PLA, for 90 minutes, followed by 90 minutes at 82° C. and 90 minutes at 121° C. to complete curing.

Figure 8A:
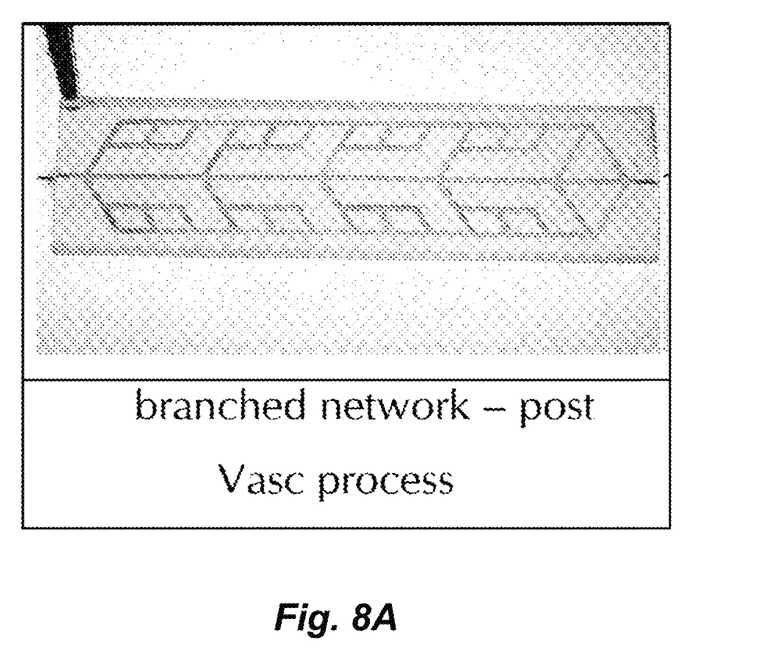
FIG. 8A depicts an embedded hollow network of interconnected microchannels in an epoxy matrix following a VaSC process.
Figure 8B:
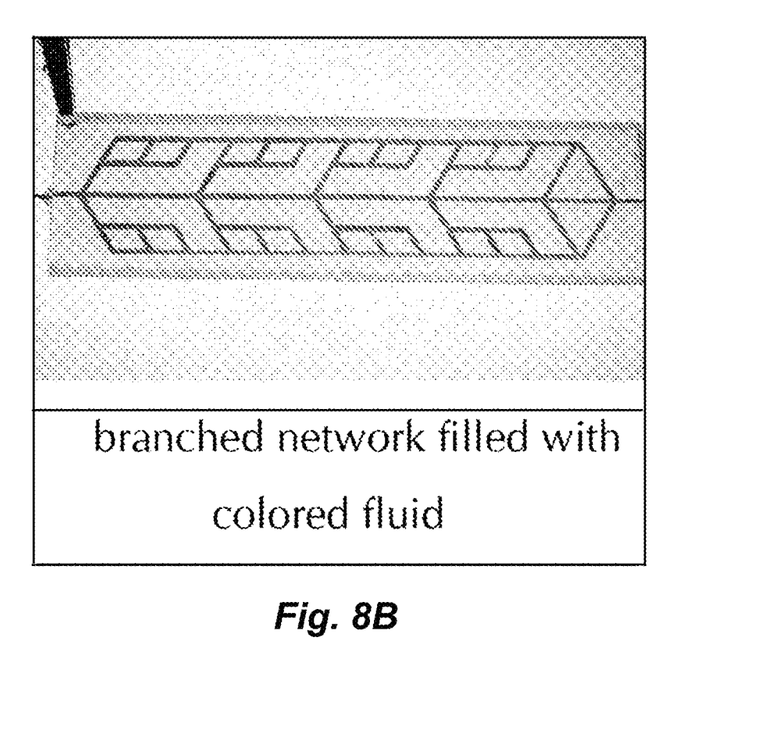
FIG. 8B depicts the network of FIG. 8A filled with a colored fluid.
Figure 9A:
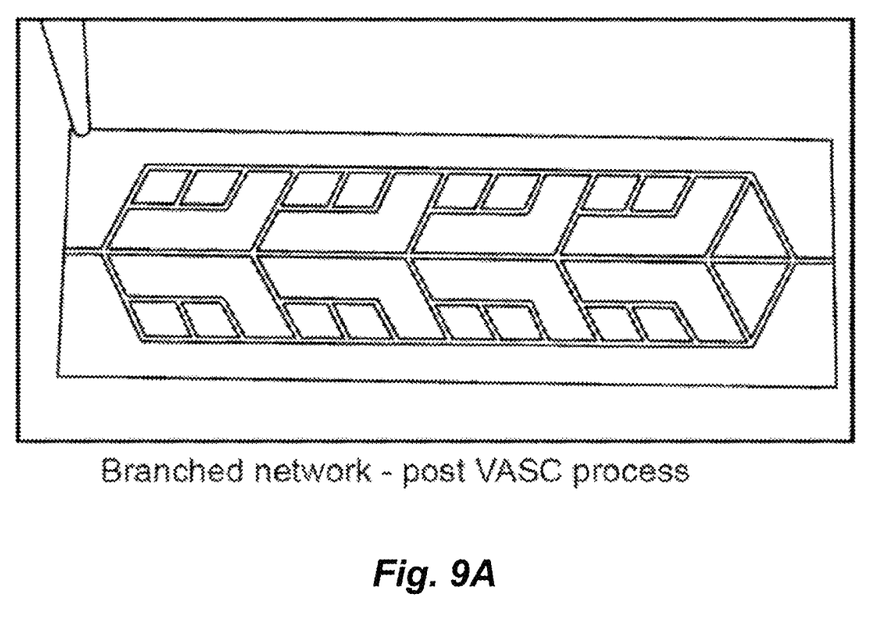
FIG. 9A is a pictorial representation of the embedded hollow network of FIG. 8A.
Figure 9B:
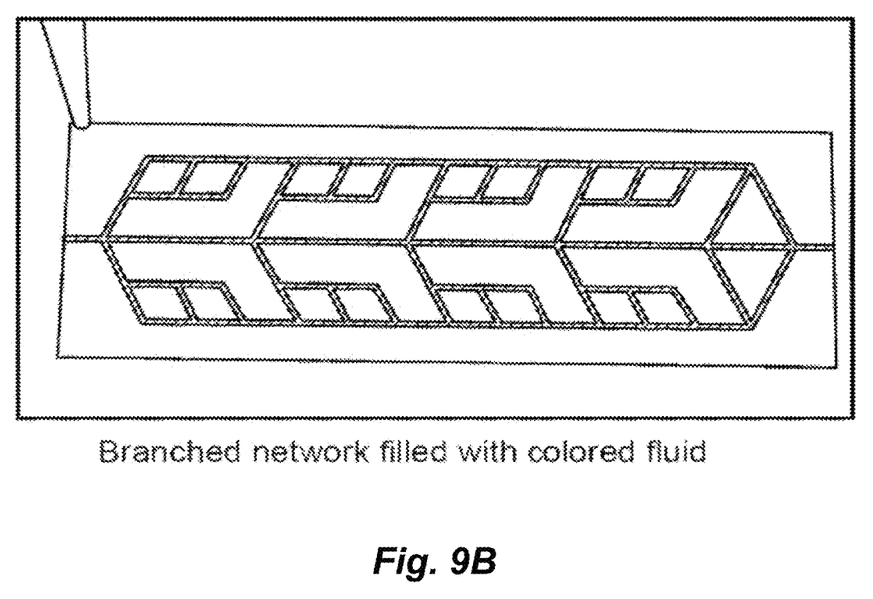
FIG. 9B is a pictorial representation of the colored fluid-filled network of FIG. 8B.

The fully cured specimen was removed from the mold and its edges were grinded in order to expose the ends of the PLA sheet. The specimen was then kept in a vacuum oven at 200° C. for 16 hours for VaSC then allowed to cool down to room temperature inside the oven under vacuum. FIG. 8A illustrates an example of embedded branched network of microchannels with channel height of 500 μm and width of 1000 μm, and a colored fluid passing through the network is shown in FIG. 8B. Branched networks cut from PLA sheets were also sandwiched between glass fiber or carbon fiber prepregs, followed by a vacuum bagging process to make multi-stacked layered composites with glass fiber/prepreg layers alternating with microvascular network layers in multiple planes.

What is claimed is:

1. A thermally degradable polymeric sheet, comprising:
a thermally degradable poly(hydroxyalkanoate) sheet; and
a metal selected from the group consisting of an alkaline earth metal and a transition metal;
wherein the volume fraction of the metal in the poly (hydroxyalkanoate) sheet is at least 0.1 vol %, and
the poly(hydroxyalkanoate) sheet comprises a network of branches along the plane of the poly(hydroxyalkanoate) sheet.

2. The polymeric sheet of claim 1, wherein the poly (hydroxyalkanoate) is poly(lactic acid).

3. The polymeric sheet of claim 1, wherein the metal is present as a metal oxalate dispersed in the poly(hydroxyalkanoate).

4. The polymeric sheet of claim 3, wherein the metal oxalate is tin(II) oxalate.

5. The polymeric sheet of claim 1, wherein the poly (hydroxyalkanoate) has a degradation temperature from 150° C. to 250° C.

6. The polymeric sheet of claim 1, wherein the poly (hydroxyalkanoate) has a degradation temperature from 165° C. to 235° C.

7. The polymeric sheet of claim 1, wherein the poly (hydroxyalkanoate) has a degradation temperature from 180° C. to 220° C.

8. The polymeric sheet of claim 1, wherein the sheet is compression molded.

9. The polymeric sheet of claim 1 wherein the network comprises single-level branches or multi-level branches.

10. The polymeric sheet of claim 1 wherein at least a portion of the branches are branched in more than one level via one or more interconnections between the branches.

11. The polymeric sheet of claim 1 wherein the branches have a width of about 1 micrometer to about 3000 micrometers, and the polymeric sheet has an average thickness of about 1 micrometer to about 3000 micrometers.

12. The polymeric sheet of claim 11 wherein the branches have a width of about 20 micrometers to about 500 micrometers.

13. The polymeric sheet of claim 1 wherein the poly (hydroxyalkanoate) comprises Formula I:

wherein
$R^1$, $R^2$, $R^3$ and $R^4$ are each independently H or alkyl;
x is 0-4; and
n is at least 10.

14. The polymeric sheet of claim 1 wherein the poly(hydroxyalkanoate) comprises at least one of moieties (i) to (vi):
(i) poly(3-hydroxybutyrate) (P3HB), (ii) poly(4-hydroxybutyrate) (P4HB), (iii) poly(3-hydroxyvalerate) (PHV), (iv) polycaprolactone, (v) poly(lactic acid) (PLA), or (vi) poly(glycolic acid) (PGA).

15. A thermally degradable polymeric sheet, comprising:
a thermally degradable poly(hydroxyalkanoate) sheet comprising Formula I:

(I)

wherein
$R^1$, $R^2$, $R^3$ and $R^4$ are each independently H or alkyl;
x is 0-4; and
n is at least 10; and
a metal selected from the group consisting of an alkaline earth metal and a transition metal;
wherein the volume fraction of the metal in the poly(hydroxyalkanoate) sheet is at least 0.1 vol %, and the poly(hydroxyalkanoate) sheet comprises a poly(lactic acid) having a weight average molecular weight of about 63 kDa to about 320 kDa.

16. A thermally degradable polymeric sheet, comprising:
a thermally degradable poly(hydroxyalkanoate) sheet; and
tin(II) oxalate dispersed in the poly(hydroxyalkanoate) sheet;
wherein the volume fraction of tin(II) oxalate in the poly(hydroxyalkanoate) sheet is about 1% to about 5%, and the particle size of tin(II) oxalate is about 20 micrometers to about 50 micrometers.

17. A thermally degradable polymeric composite, comprising:
a) a polymeric matrix; and
b) a thermally degradable poly(hydroxyalkanoate) sheet comprising a metal selected from the group consisting of an alkaline earth metal and a transition metal;
wherein the volume fraction of the metal in the poly(hydroxyalkanoate) sheet is at least 0.1 vol %, and the thermally degradable polymeric composite comprises the poly(hydroxyalkanoate) sheet layered in the polymeric matrix.

18. The composite of claim 17 wherein the polymeric matrix comprises a polyamide, a polyester, a polycarbonate, a polyether, an epoxy polymer, an epoxy vinyl ester polymer, a polyimide, an amine formaldehyde polymer, a polysulfone, a poly(acrylonitrile-butadiene-styrene), a polyurethane, a polyolefin, a polyacrylate, a poly(alkylacrylate), a polysilane, a polyphosphazene, or a combination thereof.

19. The composite of claim 17 wherein the polymer matrix comprises a glass fiber prepreg or a carbon fiber prepreg.

20. The polymeric sheet of claim 17 wherein volume fraction of the metal in the poly(hydroxyalkanoate) sheet is at least 0.2 vol %.

* * * * *